(12) United States Patent
Kakinoki

(10) Patent No.: US 11,914,793 B2
(45) Date of Patent: Feb. 27, 2024

(54) DETECTING DEVICE

(71) Applicant: Japan Display Inc., Tokyo (JP)

(72) Inventor: Yuto Kakinoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/198,385

(22) Filed: May 17, 2023

(65) Prior Publication Data

US 2023/0376119 A1 Nov. 23, 2023

(30) Foreign Application Priority Data

May 19, 2022 (JP) .................. 2022-082588

(51) Int. Cl.
*G06F 3/048* (2013.01)
*G06F 3/01* (2006.01)
*G06F 3/041* (2006.01)
*G06F 3/044* (2006.01)

(52) U.S. Cl.
CPC ............ *G06F 3/017* (2013.01); *G06F 3/0412* (2013.01); *G06F 3/0446* (2019.05); *G06F 2203/04101* (2013.01)

(58) Field of Classification Search
CPC ...... G06F 3/017; G06F 3/0446; G06F 3/0412; G06F 2203/04101
See application file for complete search history.

(56) References Cited

U.S. PATENT DOCUMENTS

| | | | |
|---|---|---|---|
| 2013/0342498 A1 | 12/2013 | Kim et al. | |
| 2014/0049486 A1* | 2/2014 | Kim | G06F 3/0446 |
| | | | 345/173 |
| 2014/0049508 A1 | 2/2014 | Kim et al. | |
| 2017/0102798 A1* | 4/2017 | Qiao | G06F 3/0442 |
| 2018/0129311 A1* | 5/2018 | Westhues | G06F 3/04166 |
| 2018/0129313 A1* | 5/2018 | Westhues | G06F 3/0383 |
| 2020/0300602 A1* | 9/2020 | Mochizuki | G01D 5/145 |
| 2021/0320218 A1* | 10/2021 | Imoto | H01L 31/02327 |
| 2021/0364604 A1* | 11/2021 | Isogai | G01S 17/08 |
| 2022/0326762 A1* | 10/2022 | Andersen | G06F 3/0444 |
| 2022/0404925 A1* | 12/2022 | Gray | G06F 3/017 |
| 2023/0076426 A1* | 3/2023 | Nakano | G06F 3/04166 |
| 2023/0107028 A1* | 4/2023 | Nakano | G06F 3/04164 |
| | | | 345/173 |
| 2023/0221821 A1* | 7/2023 | Nakanishi | G06F 3/044 |
| | | | 345/174 |
| 2023/0251738 A1* | 8/2023 | Nakano | G06F 3/04166 |
| | | | 345/173 |
| 2023/0282671 A1* | 9/2023 | Zang | H01L 27/14645 |
| | | | 257/432 |

* cited by examiner

Primary Examiner — David Phantana-angkool
(74) Attorney, Agent, or Firm — K&L Gates LLP

(57) ABSTRACT

A detecting device includes a sensor unit having a detection region in which a plurality of electrodes are arrayed, and a detector configured to detect a gesture corresponding to movement of an object to be detected in a space on the detection region based on a detected value of each of the electrodes.

11 Claims, 13 Drawing Sheets

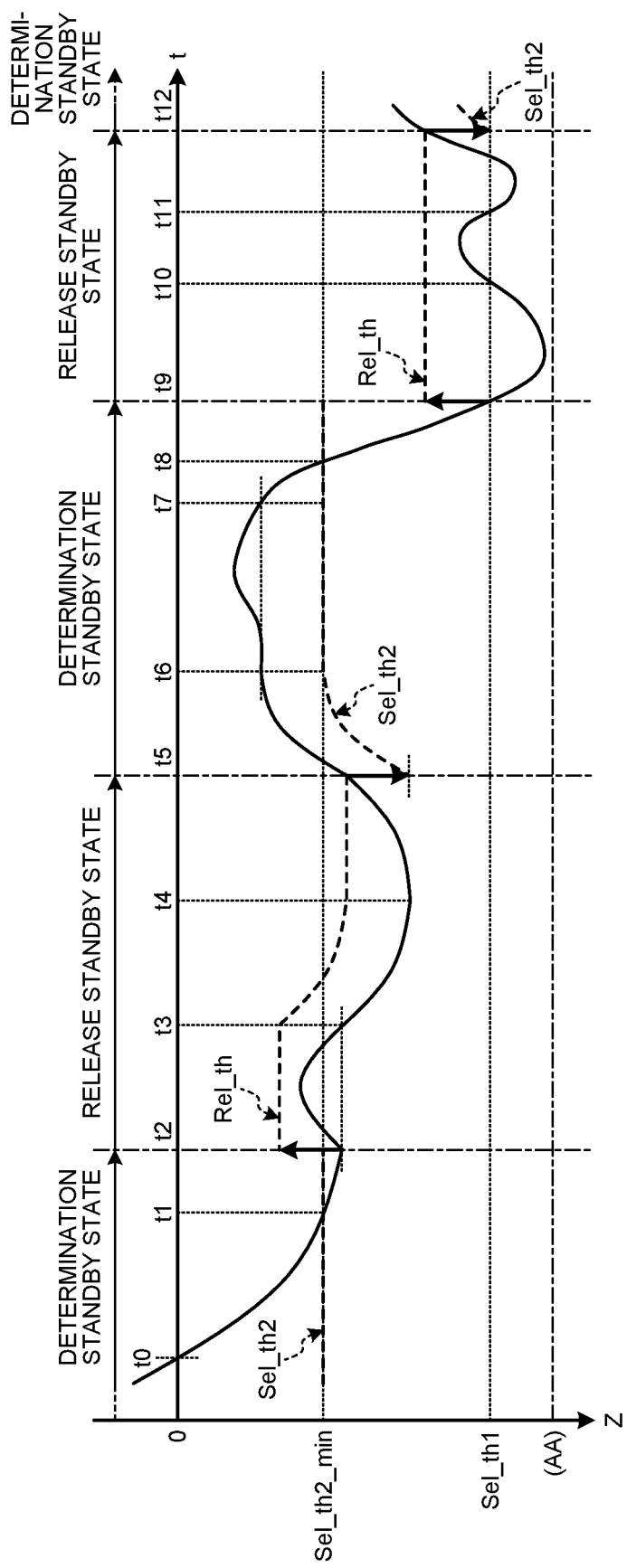

DETECTING DEVICE

CROSS-REFERENCE TO RELATED APPLICATION

This application claims the benefit of priority from Japanese Patent Application No. 2022-082588 filed on May 19, 2022, the entire contents of which are incorporated herein by reference.

BACKGROUND

1. Technical Field

The present invention relates to a detecting device.

2. Description of the Related Art

Recently known are detection systems, what are called touch panels, in which a detecting device capable of detecting an external proximity object is mounted on or integrated with a display device, such as a liquid crystal display device (refer to the specification of US Patent Application Laid-open Publication No. 2014/0049486, the specification of US Patent Application Laid-open Publication No. 2013/0342498, and the specification of US Patent Application Laid-open Publication No. 2014/0049508, for example). In such detection systems, not only a touch detection function but also what is called a hover detection function has been attracting attention. The touch detection function is a function to detect contact of an object to be detected, such as an operator's finger, with a detection surface. The hover detection function is a function to detect a proximity state of the finger not in contact with the detection surface and movement of the finger, such as a gesture, in a space on a detection region.

A determination operation (determination gesture) of selecting an object, such as a button, displayed in a display region overlapping the detection region is typically performed by touching the touch panel. The determination operation, however, has recently been required to be performed without touching the touch panel in consideration of hygiene. Examples of the determination operation using the hover detection function include, but are not limited to, detecting the movement of the operator's finger, which is the object to be detected, coming closer to the detection surface and then moving away from it. This operation, however, may possibly not be properly determined as a determination operation or may possibly be erroneously determined as another gesture due to variations in the operation.

An object of the present invention is to provide a detecting device that detects a gesture corresponding to the movement of an object to be detected in space on a detection region and that can improve the accuracy of detecting a determination operation (determination gesture).

SUMMARY

A detecting device according to an embodiment of the present invention includes a sensor unit having a detection region in which a plurality of electrodes are arrayed, and a detector configured to detect a gesture corresponding to movement of an object to be detected in a space on the detection region based on a detected value of each of the electrodes. The detector detects that a predetermined determination gesture is made when a distance between the sensor unit and the object to be detected is equal to or smaller than a first distance, and the detector detects that the determination gesture is made when the distance between the sensor unit and the object to be detected is equal to or smaller than a second distance larger than the first distance and is larger than the first distance and when a movement speed of the object to be detected in the space on the detection region is equal to or smaller than a predetermined value.

BRIEF DESCRIPTION OF THE DRAWINGS

FIG. 13 is a timing chart of a specific example of operation in the gesture determination procedure illustrated in FIG. 7.

DETAILED DESCRIPTION

Figure 1:
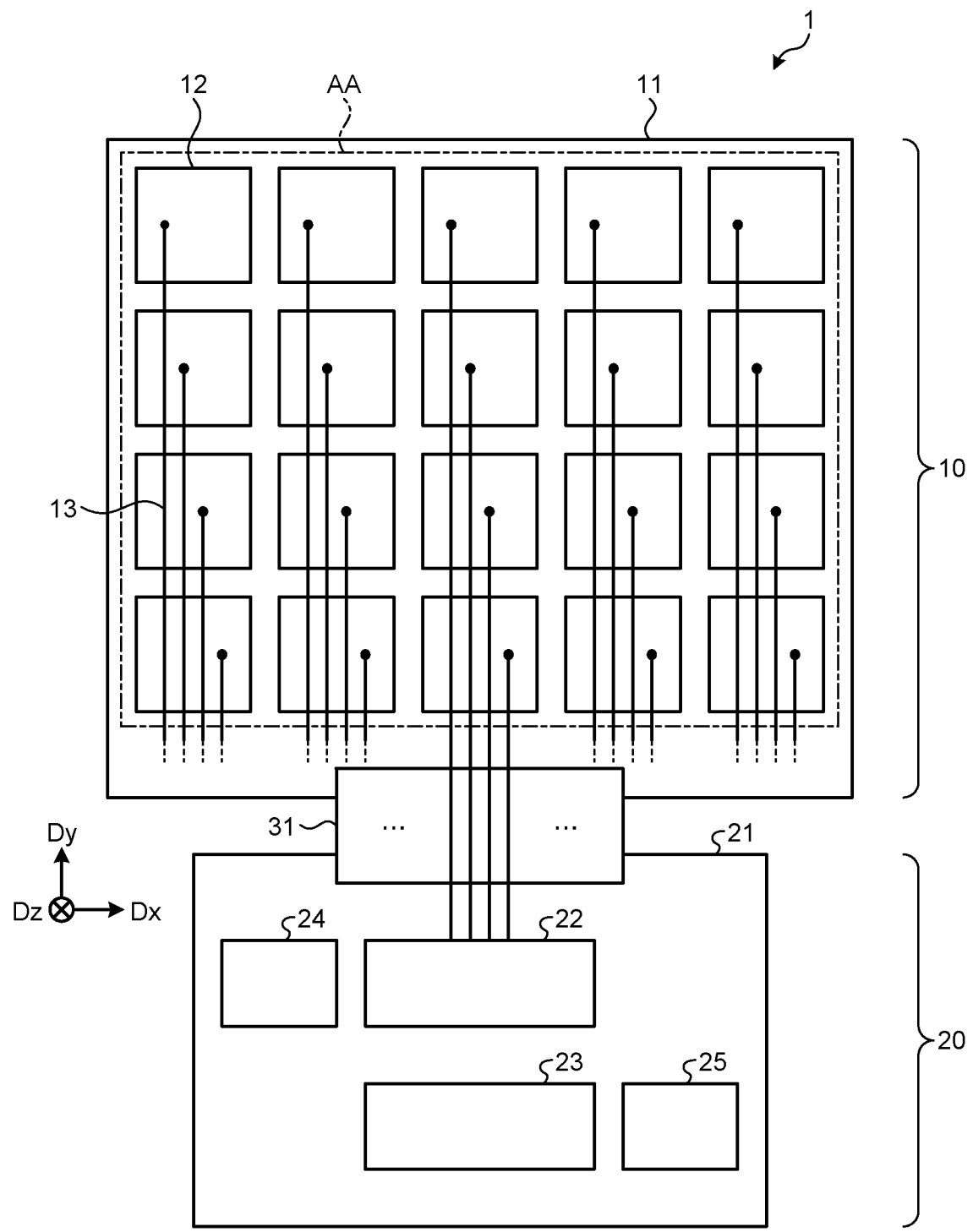
FIG. 1 is a plan view of a schematic configuration of a detecting device according to an embodiment.

Exemplary aspects (embodiments) to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below may be appropriately combined. What is disclosed herein is given by way of example only, and appropriate modifications made without departing from the spirit of the present invention and easily conceivable by those skilled in the art naturally fall within the scope of the present invention. To simplify the explanation, the drawings may possibly illustrate the width, the thickness, the shape, and other elements of each unit more schematically than those in the actual aspect. These elements, however, are given by way of example only and are not intended to limit interpretation of the present invention. In the present specification and the drawings, components similar to those previously described with reference to previous drawings are denoted by like reference numerals, and detailed explanation thereof may be appropriately omitted.

FIG. 1 is a plan view of a schematic configuration of a detecting device according to an embodiment. As illustrated in FIG. 1, a detecting device 1 includes a sensor unit 10 and a detector 20.

The sensor unit 10 includes a sensor substrate 11, a plurality of electrodes 12, and wiring 13. The electrodes 12 are provided in a detection region AA of the sensor substrate 11. The wiring 13 extends from each of the electrodes 12. The detector 20 includes a control substrate 21, a detection circuit 22, a processing circuit 23, a power circuit 24, and an interface circuit 25.

The detection region AA of the sensor substrate 11 is a region provided with the electrodes 12 arrayed in a matrix (row-column configuration) in a Dx direction (first direction) and a Dy direction (second direction). The sensor substrate 11 is a glass substrate or translucent flexible printed circuits (FPC), for example.

The detecting device 1 according to the present embodiment is configured to detect the position of an object to be detected present in a space on the detection region AA of the sensor substrate 11 and determine a gesture corresponding to the movement of the object to be detected. In the present disclosure, the Dx direction (first direction) and the Dy direction (second direction) are orthogonal to each other in the detection region AA. In the present disclosure, the direction orthogonal to the Dx direction (first direction) and the Dy direction (second direction) is a Dz direction (third direction).

In the example illustrated in FIG. 1, five electrodes 12 are arrayed in the Dx direction, and four electrodes 12 are arrayed in the Dy direction, that is, 5×4 (=20) electrodes 12 are provided. The number of electrodes 12 provided in the detection region AA of the sensor substrate 11 is not limited thereto.

The control substrate 21 is electrically coupled to the sensor substrate 11 via a wiring substrate 31. The wiring substrate 31 is flexible printed circuits, for example. Each electrode 12 of the sensor unit 10 is coupled to the detection circuit 22 of the detector 20 via the wiring substrate 31.

The control substrate 21 is provided with the detection circuit 22, the processing circuit 23, the power circuit 24, and the interface circuit 25. The control substrate 21 is a rigid substrate, for example.

The detection circuit 22 generates a detected value of each electrode 12 based on a detection signal of each electrode 12 output from the sensor substrate 11. The detection circuit 22 is an analog front end (AFE) IC, for example.

The processing circuit 23 generates the spatial coordinates indicating the position where an object to be detected (e.g., an operator's finger) is present on the detection region AA based on the detected value of each electrode 12 output from the detection circuit 22. The processing circuit 23 may be a programmable logic device (PLD), such as a field programmable gate array (FPGA), or a micro control unit (MCU), for example.

The power circuit 24 is a circuit that supplies electric power to the detection circuit 22 and the processing circuit 23.

The interface circuit 25 is a USB controller IC, for example, and is a circuit that controls communications between the processing circuit 23 and a host controller (not illustrated) of a host device on which the detection system is mounted.

Figure 2:
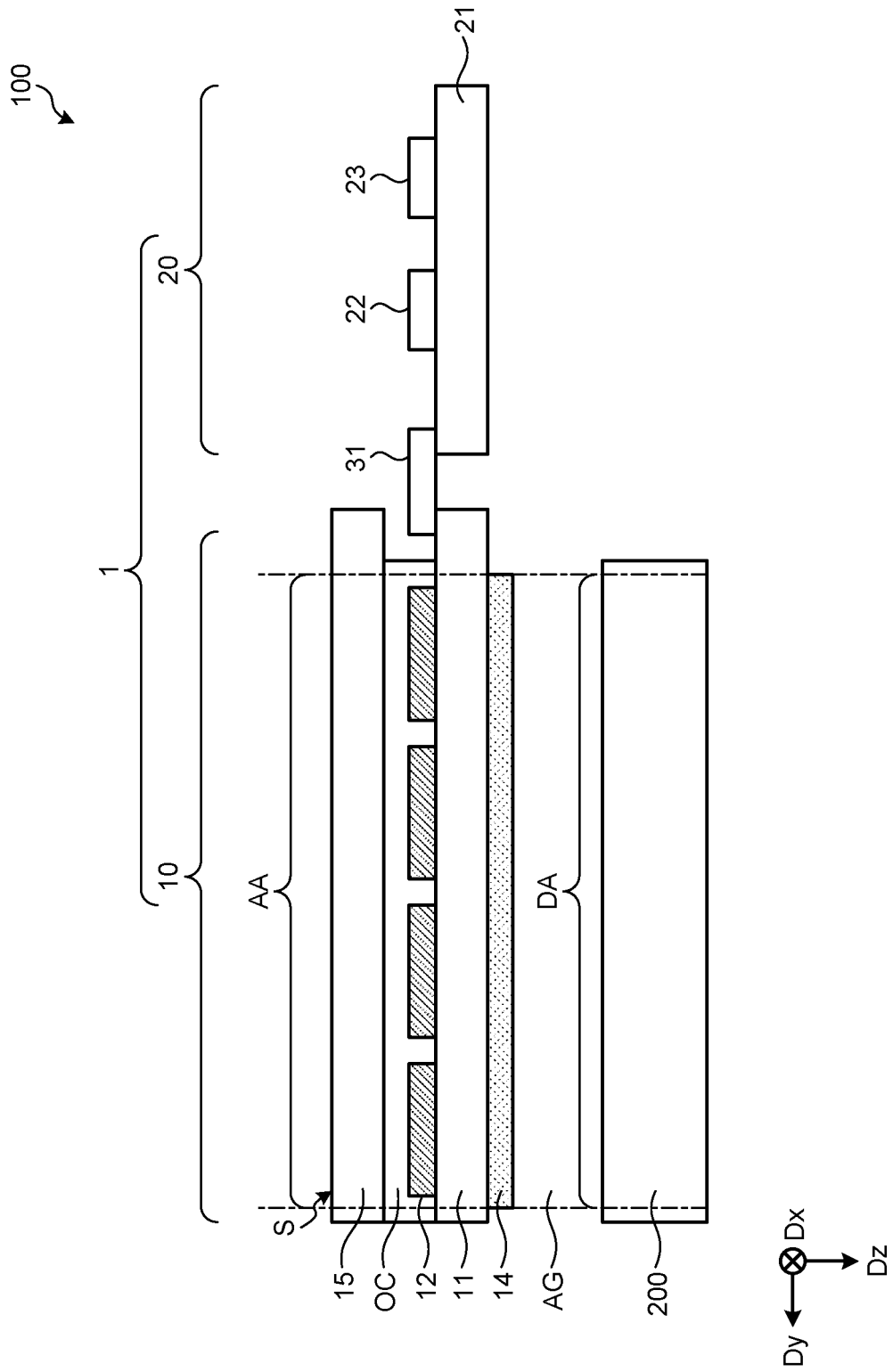
FIG. 2 is a schematic of a schematic sectional configuration of a detection system in which the detecting device according to the embodiment is used.

FIG. 2 is a schematic of a schematic sectional configuration of the detection system in which the detecting device according to the embodiment is used.

A detection system 100 includes the detecting device 1 and a display panel 200. The display panel 200 is disposed facing the sensor unit 10 of the detecting device 1 with an air gap AG interposed therebetween. The sensor unit 10 of the detecting device 1 is disposed such that the detection region AA of the sensor unit 10 and a display region DA of the display panel 200 overlap in the Dz direction (third direction) in plan view. The display panel 200 is a liquid crystal display (LCD), for example. The display panel 200 may be an organic EL display (organic light-emitting diode (OLED)), an inorganic EL display (a micro LED or a mini LED), or a transparent display that displays an image on a translucent display surface, for example.

The sensor unit 10 includes the sensor substrate 11, the electrodes 12, a shield 14, and a cover glass 15. The sensor unit 10 is composed of the shield 14, the sensor substrate 11, the electrodes 12, and the cover glass 15 stacked in this order on the display panel 200. In the following description, the surface of the cover glass 15 provided on the top layer is also referred to as a "detection surface S". The detection surface S is not limited to the surface of the cover glass 15. In the present disclosure, the detection surface S is a reference surface for defining the distance from the object to be detected in the Dz direction (third direction) and may be the surface of the electrode 12, for example.

The shield 14 is provided on a first surface of the sensor substrate 11 facing the display panel 200. The electrodes 12 are provided on a second surface of the sensor substrate 11 opposite to the first surface. The cover glass 15 is provided on the side of the second surface of the sensor substrate 11 with an adhesive layer OC interposed therebetween. The adhesive layer OC is preferably made of translucent adhesive. The adhesive layer OC may be made of a translucent double-sided adhesive film, such as optical clear adhesive (OCA).

Figure 3:
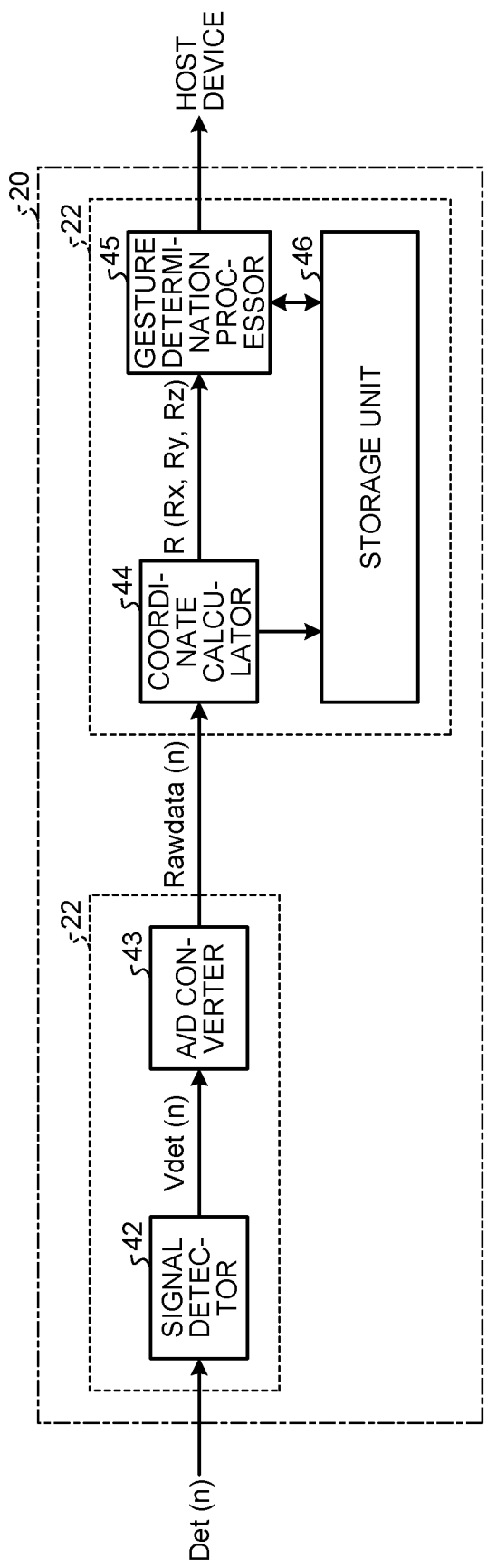
FIG. 3 is a block diagram of an exemplary configuration of a detector of the detecting device according to the embodiment.

FIG. 3 is a block diagram of an exemplary configuration of the detector of the detecting device according to the embodiment. In the present disclosure, the detector 20 detects an operation (gesture) corresponding to the movement of the object to be detected in the space on the detection region AA.

As illustrated in FIG. 3, the detector 20 includes a signal detector 42, an A/D converter 43, a coordinate calculator 44, a gesture determination processor 45, and a storage unit 46. The signal detector 42 and the A/D converter 43 are included in the detection circuit 22. The coordinate calculator 44, the gesture determination processor 45, and the storage unit 46 are included in the processing circuit 23.

The signal detector 42 generates an output value Rawdata (n) of each electrode 12 based on a detection signal Det(n) (n is a natural number from 1 to N, where N is the number of electrodes in the detection region AA) of each electrode 12 output from the sensor substrate 11. The A/D converter 43 samples and converts the output value of each electrode 12 into a digital signal.

The coordinate calculator 44 calculates spatial coordinates R (Rx,Ry,Rz) of the position where the object to be detected is present based on the output value Rawdata (n) of each electrode 12.

The gesture determination processor 45 determines a gesture corresponding to a change in the spatial coordinates R (Rx,Ry,Rz) calculated by the coordinate calculator 44.

The storage unit 46 stores therein various parameters used for the processing performed by the gesture determination processor 45. The storage unit 46 also temporarily stores therein various parameters generated in the processing performed by the gesture determination processor 45. The storage unit 46 also has a function of temporarily storing therein the spatial coordinates calculated by the coordinate calculator 44.

Figure 4A:
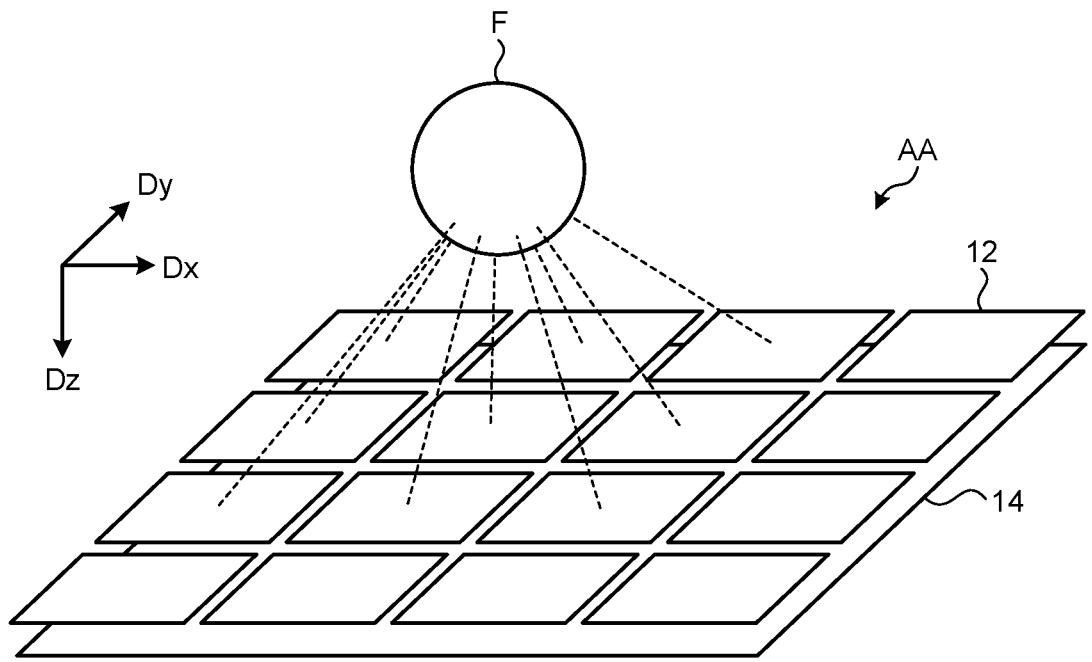
FIG. 4A is a schematic of the positional relation between the position of an object to be detected in a space on a detection region and each electrode.
Figure 4B:
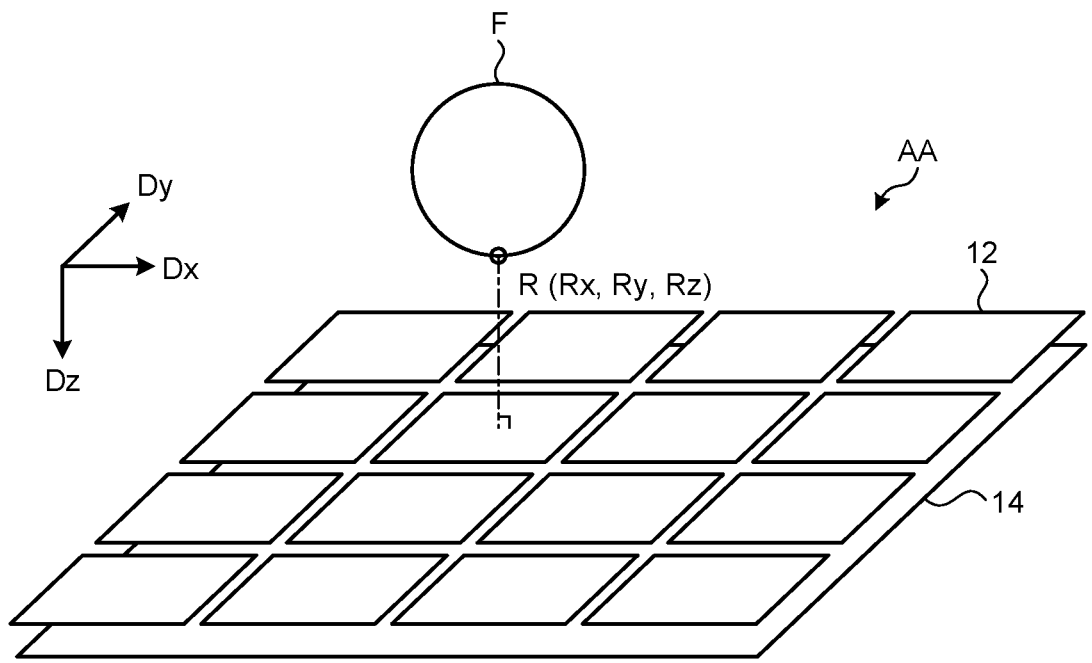
FIG. 4B is a schematic of the spatial coordinates of the object to be detected in the space on the detection region.

FIG. 4A is a schematic of the positional relation between the position of the object to be detected in a space on the detection region and each electrode. FIG. 4B is a schematic of the spatial coordinates of the object to be detected in the space on the detection region. FIGS. 4A and 4B illustrate an example where an object to be detected F is present in the space on the detection region AA.

As illustrated in FIG. 4A, each electrode 12 in the detection region AA has capacitance generated corresponding to the distance between the object to be detected F present in the space on the detection region AA and the electrode 12. The output value Rawdata(n) corresponding to the capacitance is acquired by the detection circuit 22.

The processing circuit 23 extracts spatial coordinates R (Rx,Ry,Rz) indicating the position of the object to be detected F in the space on the detection region AA illustrated in FIG. 4B using the output value Rawdata(n) of each electrode 12 generated by the detection circuit 22.

In the present disclosure, the spatial coordinates R (Rx, Ry,Rz) correspond to the position of the object to be detected F present in the space on the detection surface S. The spatial coordinates R (Rx,Ry,Rz) include first data Rx in an X-direction corresponding to the position in the Dx direction (first direction) on the detection region AA, second data Ry in a Y-direction corresponding to the position in the Dy direction (second direction) on the detection region AA, and third data Rz in a Z-direction corresponding to the position in the Dz direction (third direction) orthogonal to the Dx direction (first direction) and the Dy direction (second direction).

The processing circuit 23 transmits the processing results of the gesture determination processor 45, that is, a command indicating the gesture determined based on the movement of the object to be detected F in the space on the detection region AA to the host device via the interface circuit 25 serving as a USB controller IC, for example. The host device performs control based on the command transmitted from the processing circuit 23, that is, the processing results of the gesture determination processor 45. Specifically, the host device performs processing due to selection of an object Obj (refer to FIG. 12) displayed in the display region DA overlapping the detection region AA based on a determination operation command transmitted by a gesture determination procedure (refer to FIG. 7), which will be described later. The processing on the host device may include dragging the selected object Obj and moving the dragged object Obj according to the transition of the spatial coordinates R (Rx,Ry,Rz), for example. The present disclosure is not limited by the processing on the host device.

Figure 5:
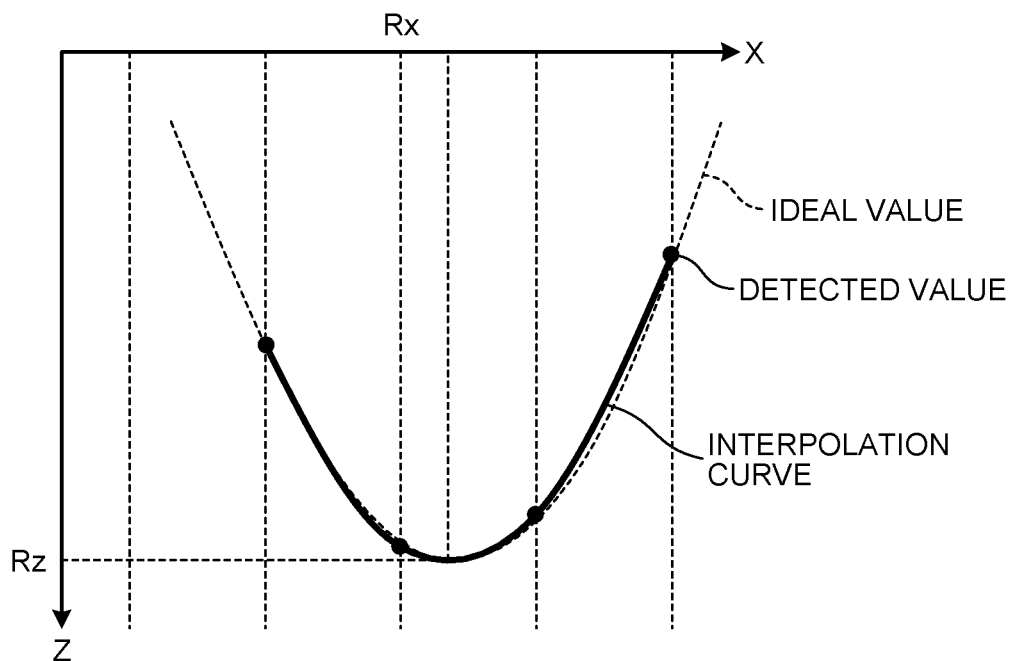
FIG. 5 is a conceptual diagram of an example of the method for extracting the spatial coordinates of the object to be detected.

FIG. 5 is a conceptual diagram of an example of the method for extracting the spatial coordinates of the object to be detected. In FIG. 5, the horizontal axis indicates the first data Rx in the X-direction of the spatial coordinates R (Rx,Ry,Rz) (corresponding to the position of the object to be detected F in the Dx direction in the detection region AA), and the vertical axis indicates the third data Rz in the Z-direction of the spatial coordinates R (Rx,Ry,Rz) (corresponding to the position of the object to be detected F in the Dz direction).

The calculated value represented by the solid line in FIG. 5 is obtained by interpolation using the output value Rawdata(n) of each electrode 12, for example. The method for calculating the calculated value illustrated in FIG. 5 is not limited to interpolation and may be approximation, for example.

In the present disclosure, the third data Rz in the Z-direction of the spatial coordinates R (Rx,Ry,Rz) satisfies "Rz=0" when the object to be detected F fails to be detected. In other words, the third data Rz in the Z-direction of the spatial coordinates R (Rx,Ry,Rz) takes a smaller value when the object to be detected F is positioned farther away from the detection surface S and a larger value when it is positioned closer to the detection surface S.

Figure 6A:
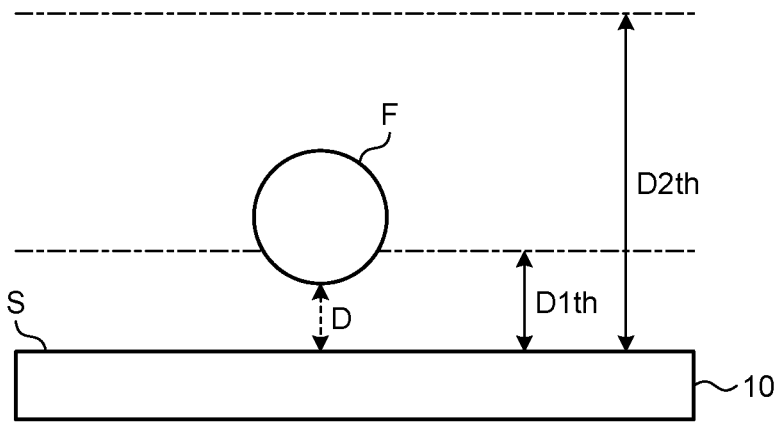
FIG. 6A is a schematic for explaining the relation between the distance between a sensor unit and the object to be detected and the determination operation.
Figure 6B:
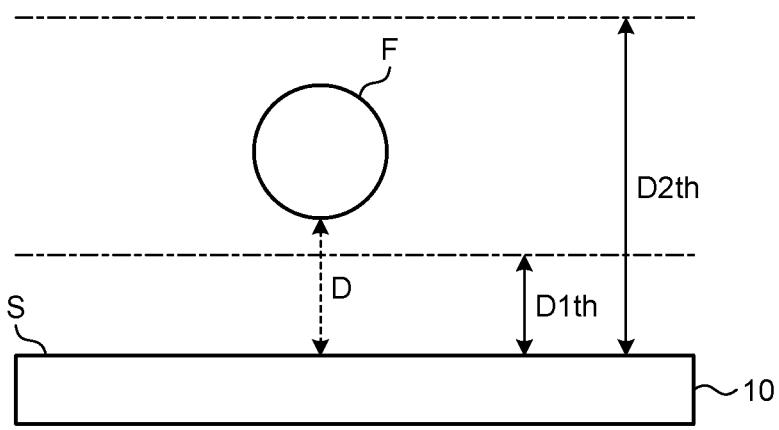
FIG. 6B is another schematic for explaining the relation between the distance between the sensor unit and the object to be detected and the determination operation.
Figure 6C:
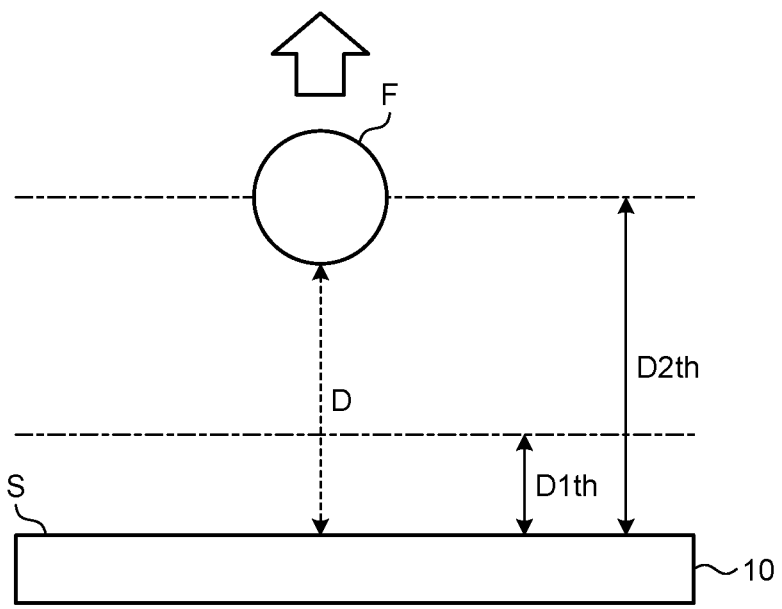
FIG. 6C is still another schematic for explaining the relation between the distance between the sensor unit and the object to be detected and the determination operation.

The following describes the relation between the distance between the sensor unit 10 and the object to be detected F and the determination operation in a gesture determination process, which will be described later, with reference to FIGS. 6A, 6B, and 6C. FIGS. 6A, 6B, and 6C are schematics for explaining the relation between the distance between the sensor unit and the object to be detected and the determination operation. In the following description, the determination operation corresponding to the movement of the object to be detected F in the space on the detection region AA is also referred to as a "determination gesture".

As illustrated in FIG. 6A, the detecting device 1 according to the embodiment detects that a determination gesture is made when a distance D in the Dz direction (third direction) between the detection surface S of the sensor unit 10 and the object to be detected F is equal to or smaller than a first distance D1th (D≤D1th).

As illustrated in FIG. 6B, the detecting device 1 according to the embodiment also detects that a determination gesture is made when the distance D in the Dz direction (third direction) between the detection surface S of the sensor unit 10 and the object to be detected F is equal to or smaller than a second distance D2th, which is larger than the first distance D1th, and larger than the first distance D1th (D1th<D≤D2th), and when the movement speed of the object to be detected F in the space on the detection region AA (corresponding to a movement amount ΔRxy per unit time in the XY-plane of the spatial coordinates R (Rx,Ry,Rz) and a movement amount ΔRz per unit time in the Z-direction, which will be described later) is equal to or smaller than a predetermined value (corresponding to a movement amount threshold ΔRxy_th in the XY-plane of the spatial coordinates R (Rx,Ry,Rz) and a first movement amount threshold ΔRz_th1 in the Z-direction, which will be described later). In other words, the detecting device 1 detects that a determination gesture is made when the object to be detected F can be regarded to be stationary at a position closer than the second distance D2th and farther than the first distance D1th with respect to the detection surface S of the sensor unit 10.

As illustrated in FIG. 6C, the detecting device 1 according to the embodiment also detects that a determination gesture is made when the distance D in the Dz direction (third direction) between the detection surface S of the sensor unit 10 and the object to be detected F is equal to or smaller than the second distance D2th and larger than the first distance D1th (D1th<D≤D2th), and when the speed at which the object to be detected F moves away from the detection surface S of the sensor unit 10 in the Dz direction (third direction), that is, the speed at which the object to be detected F moves in the arrow direction in FIG. 6C (corresponding to a magnitude ΔRz of a negative movement amount ΔRz per unit time in the Z-direction of the spatial coordinates R (Rx,Ry,Rz), which will be described later) is equal to or larger than a predetermined value (corresponding to a second movement amount threshold ΔRz_th2 in the Z-direction of the spatial coordinates R (Rx,Ry,Rz), which will be described later). In other words, the detecting device 1 detects that a determination gesture is made when the object to be detected F can be regarded to be moving away at a predetermined speed or faster from a position closer than the second distance D2th and farther than the first distance D1th with respect to the detection surface S of the sensor unit 10.

With this configuration, the detecting device 1 can expand the range of the determination operation while limiting the movement speed of the object to be detected F and improve the accuracy of detecting the determination operation (determination gesture).

Figure 7:
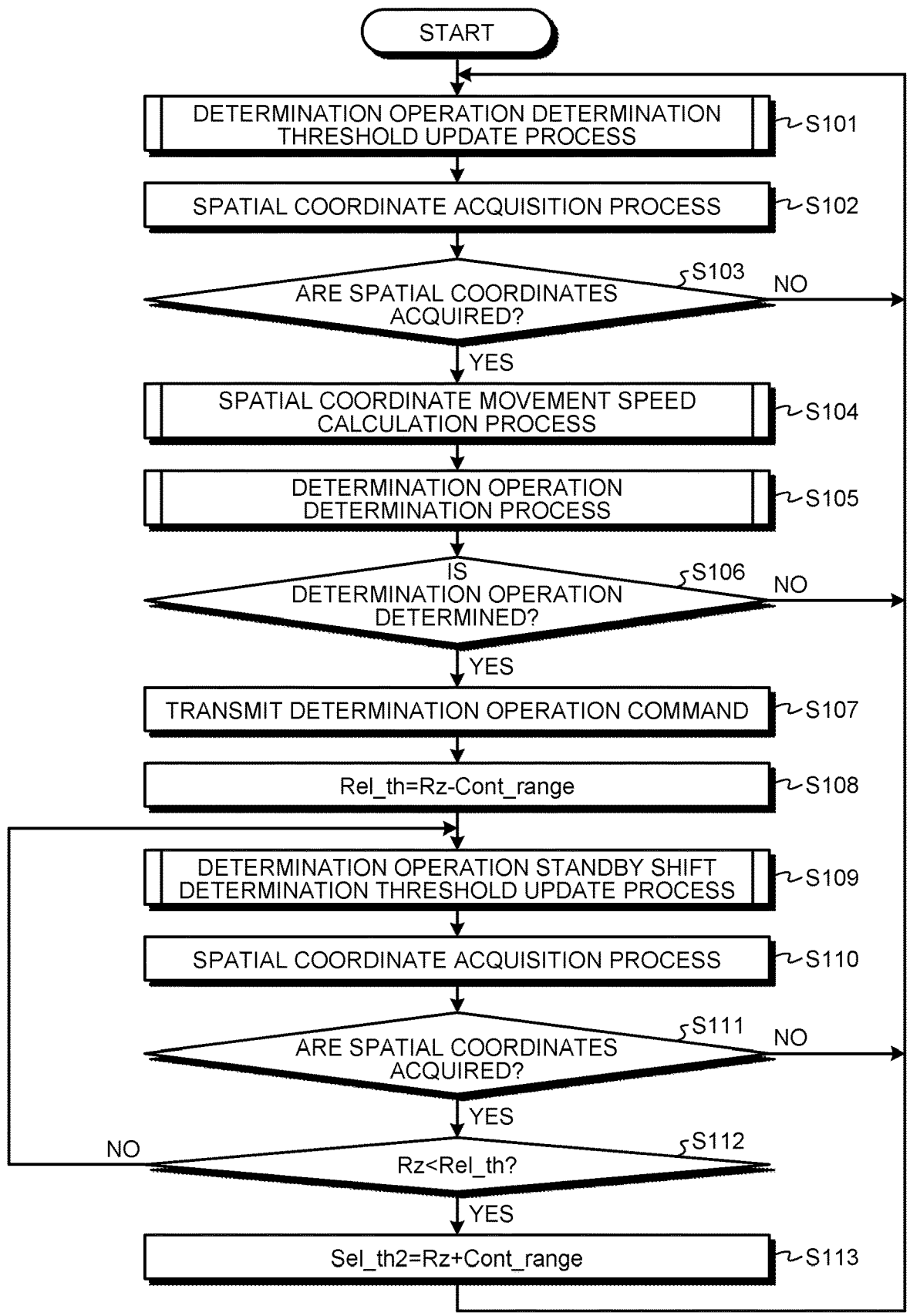
FIG. 7 is a flowchart of an example of a gesture determination process performed by the detecting device according to the embodiment.
Figure 8:
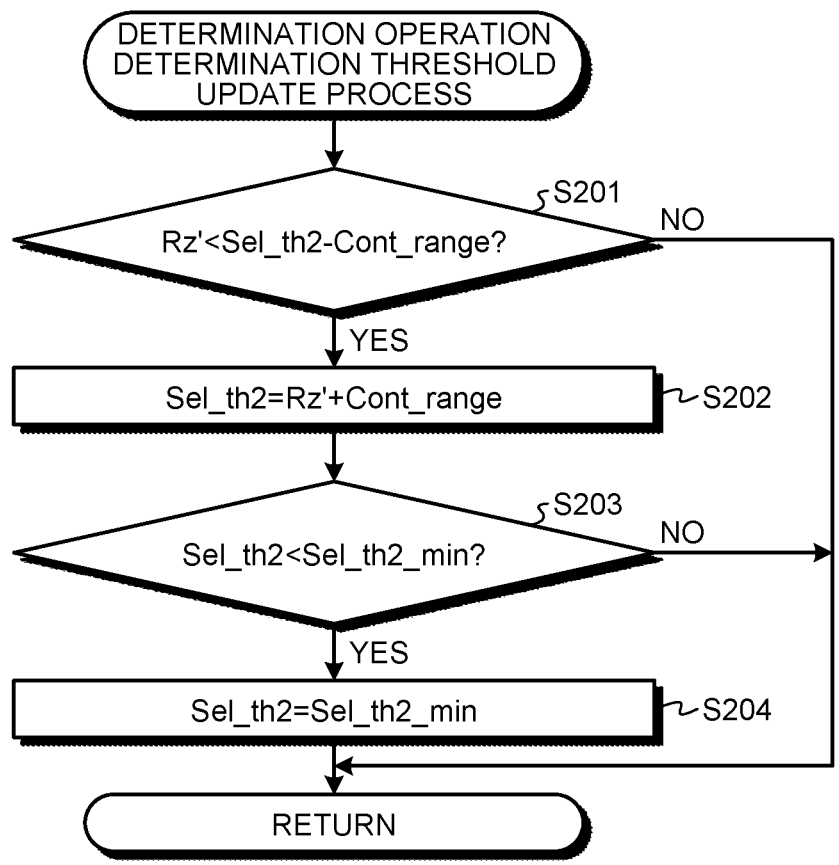
FIG. 8 is a sub-flowchart of an example of a determination operation determination threshold update process illustrated in FIG. 7.
Figure 9:
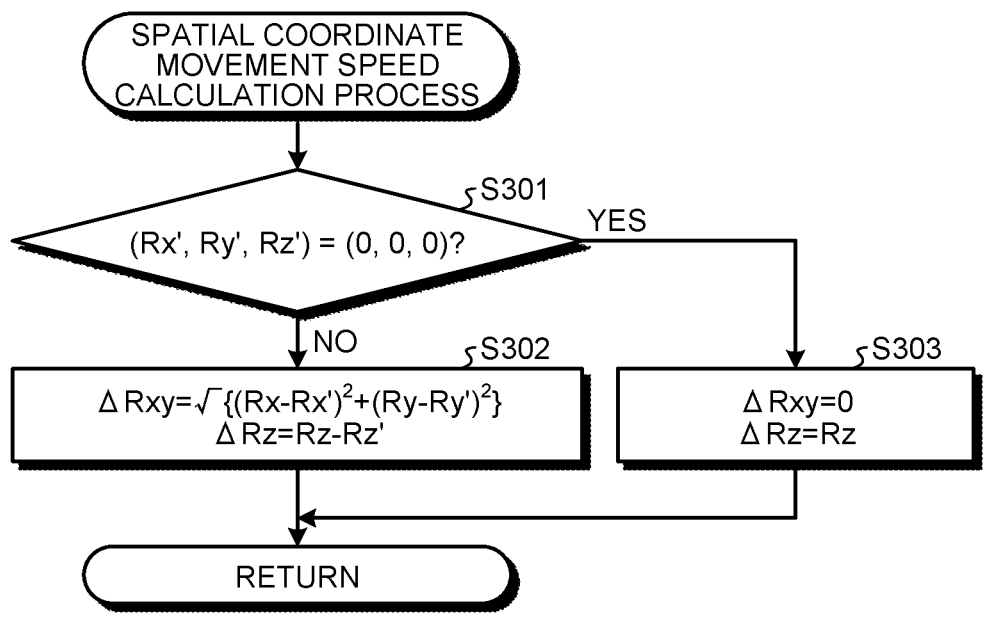
FIG. 9 is a sub-flowchart of an example of a spatial coordinate movement speed calculation process illustrated in FIG. 7.
Figure 10:
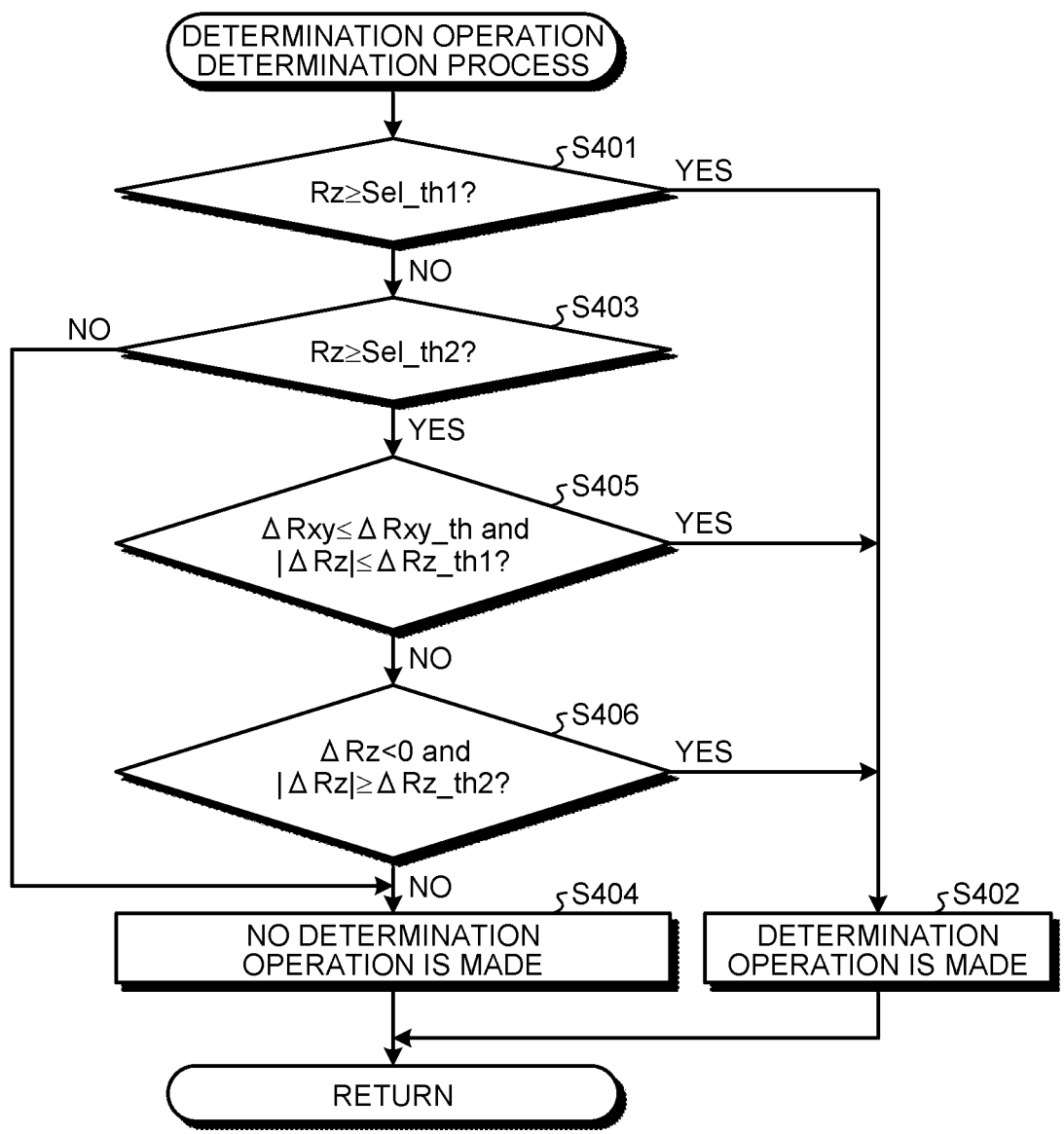
FIG. 10 is a sub-flowchart of an example of a determination operation determination process illustrated in FIG. 7.
Figure 11:
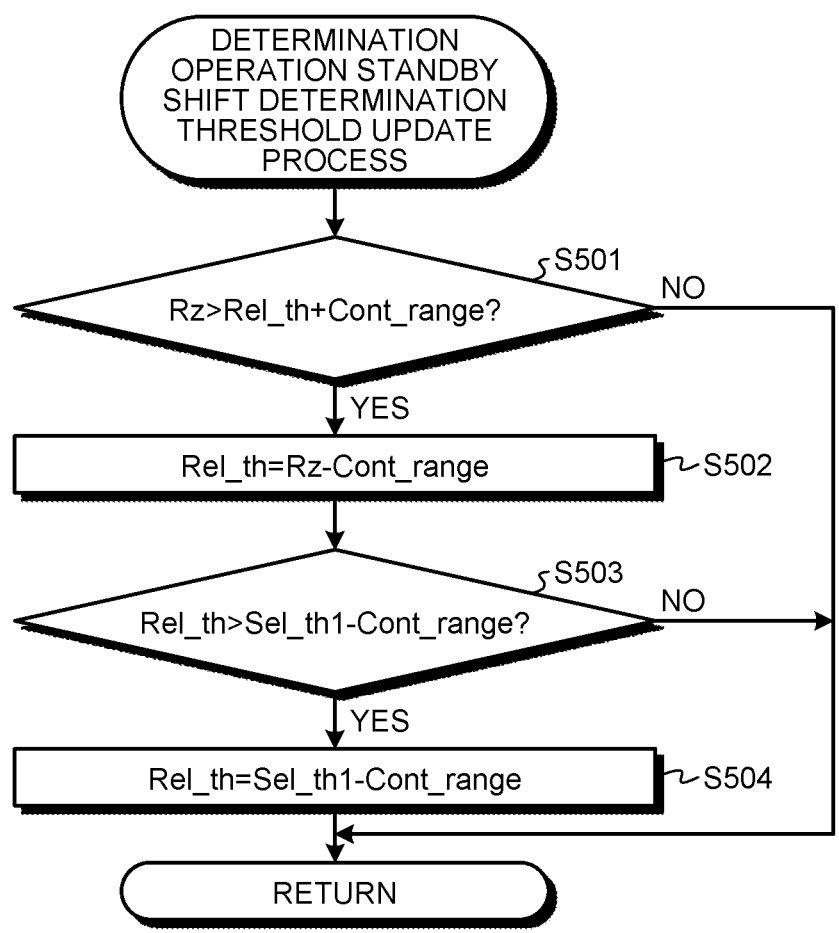
FIG. 11 is a sub-flowchart of an example of a determination operation standby shift determination threshold update process illustrated in FIG. 7.
Figure 12:
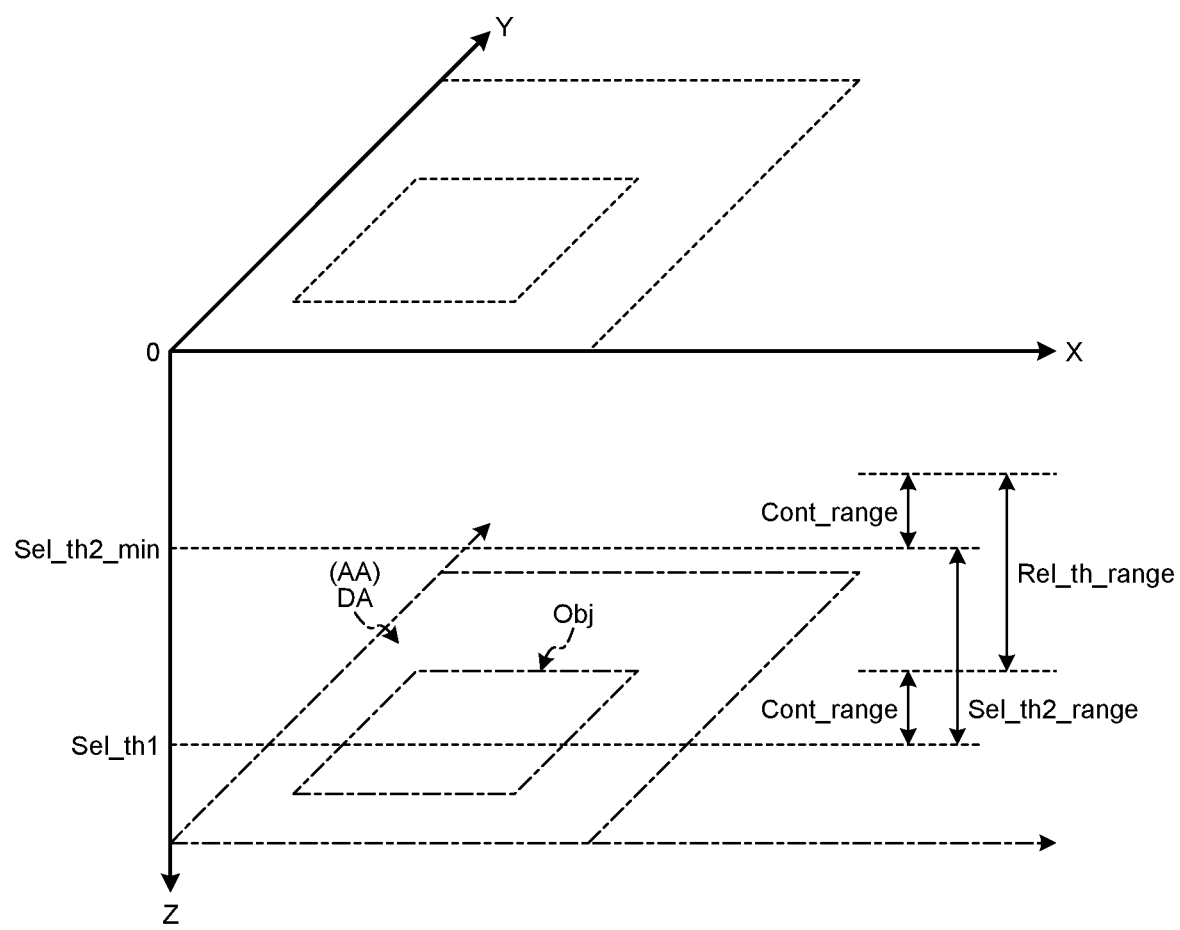
FIG. 12 is a conceptual diagram of various thresholds in the gesture determination process.

The following describes a specific example of the gesture determination process performed by the detecting device 1 according to the embodiment with reference to FIGS. 7, 8, 9, 10, 11, and 12. FIG. 7 is a flowchart of an example of the gesture determination process performed by the detecting device according to the embodiment. FIG. 8 is a sub-flowchart of an example of a determination operation determination threshold update process illustrated in FIG. 7. FIG. 9 is a sub-flowchart of an example of a spatial coordinate movement speed calculation process illustrated in FIG. 7. FIG. 10 is a sub-flowchart of an example of a determination operation determination process illustrated in FIG. 7. FIG. 11 is a sub-flowchart of an example of a determination operation standby shift determination threshold update process illustrated in FIG. 7. FIG. 12 is a conceptual diagram of various thresholds in the gesture determination process.

The present embodiment describes a determination gesture for selecting the object Obj displayed in the display region DA overlapping the detection region AA as illustrated in FIG. 12. The storage unit 46 stores therein a first determination operation determination threshold Sel_th1 (corresponding to the first distance D1th illustrated in FIGS. 6A, 6B, and 6C), a second determination operation determination threshold minimum value Sel_th2_min, and an offset value Cont_range illustrated in FIG. 12 as parameters for performing the gesture determination procedure illustrated in FIG. 7. The first determination operation determination threshold Sel_th1 and the second determination operation determination threshold minimum value Sel_th2_min are set values for the position of the object to be detected F in the Dz direction, that is, the third data Rz in the Z-direction of the spatial coordinates R (Rx,Ry,Rz). The offset value Cont_range is used to calculate a second determination operation determination threshold Sel_th2 (corresponding to the second distance D2th illustrated in FIGS. 6A, 6B, and 6C) and a determination operation standby determination threshold Rel_th in each processing of the gesture determination process.

If the third data Rz in the Z-direction of the spatial coordinates R (Rx,Ry,Rz) is equal to or larger than the first determination operation determination threshold Sel_th1 in a determination standby state for a determination gesture, the gesture determination processor determines that a determination gesture is made (Steps S101 to S108 in the gesture determination procedure illustrated in FIG. 7) and shifts to a release standby state. In the release standby state after determining the determination operation, if the third data Rz in the Z-direction of the spatial coordinates R (Rx,Ry,Rz) is smaller than a value obtained by subtracting the offset value Cont_range from the first determination operation determination threshold Sel_th1 (Steps S109 to S113 in FIG. 7), the gesture determination processor 45 shifts to the determination standby state.

In the determination standby state for a determination gesture, if the third data Rz in the Z-direction of the spatial coordinates R (Rx,Ry,Rz) is equal to or larger than the second determination operation determination threshold minimum value Sel_th2_min and smaller than the first determination operation determination threshold Sel_th1, and if the movement speed of the spatial coordinates R (Rx,Ry,Rz) in the space in the detection region AA is equal to or smaller than a predetermined value, or if the movement speed in the minus direction of the third data Rz in the Z-direction of the spatial coordinates R (Rx,Ry,Rz) is equal to or larger than a predetermined value, the gesture determination processor 45 determines that a determination gesture is made (Steps S101 to S108 in the gesture determination procedure illustrated in FIG. 7) and shifts to the release standby state. In the release standby state after determining the determination operation, if the third data Rz in the Z-direction of the spatial coordinates R (Rx,Ry,Rz) is smaller than a value obtained by subtracting the offset value Cont_range from the position at which the third data Rz is maximum in the range equal to or larger than the second determination operation determination threshold minimum value Sel_th2_min and smaller than the first determination operation determination threshold Sel_th1 (Steps S109 to S113 in FIG. 7), the gesture determination processor 45 shifts to the determination standby state.

As a precondition for the gesture determination procedure illustrated in FIG. 7, the storage unit 46 temporarily stores therein first data Rx', second data Ry', and third data Rz' of spatial coordinates R' (Rx',Ry',Rz') in the prior processing (Steps S103, S106, S111, and S113, which will be described later), the second determination operation determination threshold Sel_th2, and the determination operation standby determination threshold Rel_th. First, the gesture determination processor 45 of the processing circuit 23 performs the determination operation threshold update process illustrated in FIG. 8 (Step S101 in FIG. 7).

In the determination standby state for a determination gesture, the gesture determination processor 45 reads the third data Rz' in the prior processing from the storage unit 46 and determines whether the third data Rz' in the prior processing is smaller than a value obtained by subtracting the offset value Cont_range from the second determination operation determination threshold Sel_th2 (Rz'<Sel_th2−Cont_range) (Step S201).

If the third data Rz' in the prior processing is equal to or larger than the value obtained by subtracting the offset value Cont_range from the second determination operation determination threshold Sel_th2 (Rz'≥Sel_th2−Cont_range) (No at Step S201), the gesture determination processor 45 returns to the gesture determination procedure illustrated in FIG. 7.

If the third data Rz' in the prior processing is smaller than the value obtained by subtracting the offset value Cont_range from the second determination operation determination threshold Sel_th2 (Rz'<Sel_th2−Cont_range) (Yes at Step S201), the gesture determination processor 45 sets the second determination operation determination threshold Sel_th2 to a value obtained by adding the offset value Cont_range to the third data Rz' in the prior processing (Sel_th2=Rz'+Cont_range) (Step S202). Subsequently, the gesture determination processor 45 determines whether the second determination operation determination threshold Sel_th2 is smaller than the second determination operation determination threshold minimum value Sel_th2_min (Sel_th2<Sel_th2_min) (Step S203).

If the second determination operation determination threshold Sel_th2 is equal to or larger than the second determination operation determination threshold minimum value Sel_th2_min (Sel_th2≥Sel_th2_min) (No at Step S203), the gesture determination processor 45 temporarily stores the second determination operation determination threshold Sel_th2 calculated at Step S202 in the storage unit 46 and returns to the gesture determination procedure illustrated in FIG. 7.

If the second determination operation determination threshold Sel_th2 is smaller than the second determination operation determination threshold minimum value Sel_th2_min (Sel_th2<Sel_th2_min) (Yes at Step S203), the gesture determination processor 45 temporarily stores the second determination operation determination threshold minimum value Sel_th2_min in the storage unit 46 as the second determination operation determination threshold Sel_th2 (Step S204) and returns to the gesture determination procedure illustrated in FIG. 7.

Referring back to FIG. 7, the gesture determination processor 45 performs the process of acquiring the spatial coordinates R (Rx,Ry,Rz) from the coordinate calculator 44 (Step S102) and determines whether the spatial coordinates R (Rx,Ry,Rz) can be acquired (Step S103). If the spatial coordinates R (Rx,Ry,Rz) fail to be acquired (No at Step S103), the gesture determination processor 45 temporarily stores the spatial coordinates R' (Rx',Ry',Rz') where the first data Rx' in the X-direction=0, the second data Ry' in the Y-direction=0, and the third data Rz' in the Z-direction=0 are satisfied in the storage unit 46 and performs the determination operation threshold update process (FIG. 8) at Step S101 again.

If the spatial coordinates R (Rx,Ry,Rz) are acquired (Yes at Step S103), the gesture determination processor 45 performs the spatial coordinate movement speed calculation process illustrated in FIG. 9 (Step S104 in FIG. 7).

The gesture determination processor 45 reads the first data Rx' in the X-direction, the second data Ry' in the Y-direction, and the third data Rz' in the Z-direction of the spatial coordinates R' (Rx',Ry',Rz') in the prior processing from the storage unit 46 and determines whether the spatial coordinates R' (Rx',Ry',Rz') in the prior processing satisfy the first data Rx' in the X-direction=0, the second data Ry' in the Y-direction=0, and the third data Rz' in the Z-direction=0 (Step S301). If the spatial coordinates R' (Rx',Ry',Rz') in the prior processing satisfy the first data Rx' in the X-direction=0, the second data Ry' in the Y-direction=0, and the third data Rz' in the Z-direction=0, it indicates that the spatial coordinates R (Rx,Ry,Rz) fail to be acquired in the prior processing (No at Step S103).

If the spatial coordinates R' (Rx',Ry',Rz') in the prior processing do not satisfy the first data Rx' in the X-direction=0, the second data Ry' in the Y-direction=0, and the third data Rz' in the Z-direction=0 (No at Step S301), that is, if the spatial coordinates R (Rx,Ry,Rz) are acquired in the prior processing (Yes at Step S103), the gesture determination processor 45 calculates the movement speed in the Dx-Dy plane and the movement speed in the Dz direction (Step S302) and returns to the gesture determination procedure illustrated in FIG. 7.

The movement speed in the Dx-Dy plane is, in other words, the movement amount ΔRxy per unit time in the XY-plane, and the movement speed in the Dz direction is, in other words, the movement amount ΔRz per unit time in the Z-direction. In FIG. 9, the movement amount ΔRxy per unit time in the XY-plane is calculated as the movement speed in the Dx-Dy plane as expressed by Expression (1) below, and the movement amount ΔRz per unit time in the Z-direction is calculated as the movement speed in the Dz direction as expressed in Expression (2) below, for example. In the present disclosure, the process of acquiring the spatial coordinates R (Rx,Ry,Rz) may be performed in a sampling cycle in the A/D converter 43, or the spatial coordinates R (Rx,Ry,Rz) may be acquired in each of a plurality of sampling cycles. The spatial coordinates R (Rx,Ry,Rz) simply needs to be acquired in a predetermined cycle, and the present disclosure is not limited by the acquisition cycle of the spatial coordinates R (Rx,Ry,Rz).

$$\Delta Rxy = \sqrt{\{(Rx-Rx')^2+(Ry-Ry')^2\}} \quad (1)$$

$$\Delta Rz = Rz - Rz' \quad (2)$$

If the spatial coordinates R' (Rx',Ry',Rz') in the prior processing satisfy the first data Rx' in the X-direction=0, the second data Ry' in the Y-direction=0, and the third data Rz' in the Z-direction=0 (Yes at Step S301), that is, if the spatial coordinates R (Rx,Ry,Rz) fail to be acquired in the prior processing (No at Step S103), the gesture determination processor 45 sets the movement amount ΔRxy in the XY-plane to 0 and sets the movement amount ΔRz in the Z-direction to 0 (Step S303) and returns to the gesture determination procedure illustrated in FIG. 7.

Subsequently, the gesture determination processor 45 performs the determination operation determination process illustrated in FIG. 10 (Step S105 in FIG. 7).

The gesture determination processor 45 determines whether the third data Rz in the Z-direction of the spatial coordinates R (Rx,Ry,Rz) is equal to or larger than the first determination operation determination threshold Sel_th1 (Rz≥Sel_th1) (Step S401). If the third data Rz is equal to or larger than the first determination operation determination threshold Sel_th1 (Rz≥Sel_th1) (Yes at Step S401), the gesture determination processor 45 determines that a determination gesture is made (Step S402) and returns to the gesture determination procedure illustrated in FIG. 7.

If the third data Rz is smaller than the first determination operation determination threshold Sel_th1 (Rz<Sel_th1) (No at Step S401), the gesture determination processor 45 determines whether the third data Rz in the Z-direction of the spatial coordinates R (Rx,Ry,Rz) is equal to or larger than the second determination operation determination threshold Sel_th2 (Rz≥Sel_th2) (Step S403). If the third data Rz in the Z-direction of the spatial coordinates R (Rx,Ry,Rz) is smaller than the second determination operation determination threshold Sel_th2 (Rz<Sel_th2) (No at Step S403), the gesture determination processor 45 determines that no determination gesture is made (Step S404) and returns to the gesture determination procedure illustrated in FIG. 7.

If the third data Rz is equal to or larger than the second determination operation determination threshold Sel_th2 (Rz≥Sel_th2) (Yes at Step S403), the gesture determination processor 45 determines whether the movement amount ΔRxy per unit time in the XY-plane is equal to or smaller than the movement amount threshold $\Delta Rxy\_th$ in the XY-plane and whether the magnitude $\Delta Rz$ of the movement amount per unit time in the Z-direction is equal to or smaller than the first movement amount threshold $\Delta Rz\_th1$ in the Z-direction ($\Delta Rxy \leq \Delta Rxy\_th$ and $|\Delta Rz| \leq \Delta Rz\_th1$) (Step S405).

If the movement amount $\Delta Rxy$ per unit time in the XY-plane is equal to or smaller than the movement amount threshold $\Delta Rxy\_th$ in the XY-plane, and if the magnitude $\Delta Rz$ of the movement amount per unit time in the Z-direction is equal to or smaller than the first movement amount threshold $\Delta Rz\_th1$ in the Z-direction ($\Delta Rxy \leq \Delta Rxy\_th$ and $|\Delta Rz| \leq \Delta Rz\_th1$) (Yes at Step S405), the gesture determination processor 45 determines that a determination gesture is made (Step S402) and returns to the gesture determination procedure illustrated in FIG. 7.

If the movement amount $\Delta Rxy$ per unit time in the XY-plane is larger than the movement amount threshold $\Delta Rxy\_th$ in the XY-plane, or if the magnitude $\Delta Rz$ of the movement amount per unit time in the Z-direction is larger than the first movement amount threshold $\Delta Rz\_th1$ in the Z-direction ($\Delta Rxy > \Delta Rxy\_th$ or $|\Delta Rz| > \Delta Rz\_th1$) (No at Step S405), the gesture determination processor 45 determines whether the movement amount per unit time in the Z-direction is a negative value and whether the magnitude $\Delta Rz$ of the movement amount per unit time in the Z-direction is equal to or larger than the second movement amount threshold $\Delta Rz\_th2$ in the Z-direction ($\Delta Rz < 0$ and $|\Delta Rz| \geq \Delta Rz\_th2$) (Step S406).

If the movement amount per unit time in the Z-direction is a negative value, and if the magnitude $|\Delta Rz|$ of the movement amount per unit time in the Z-direction is equal to or larger than the second movement amount threshold $\Delta Rz\_th2$ in the Z-direction ($\Delta Rz < 0$ and $|\Delta Rz| \geq \Delta Rz\_th2$) (Yes at Step S406), the gesture determination processor 45 determines that a determination gesture is made (Step S402) and returns to the gesture determination procedure illustrated in FIG. 7.

If the movement amount per unit time in the Z-direction is a positive value, or if the magnitude $|\Delta Rz|$ of the movement amount per unit time in the Z-direction is smaller than the second movement amount threshold $\Delta Rz\_th2$ in the Z-direction ($\Delta Rz > 0$ or $|\Delta Rz| < \Delta Rz\_th2$) (No at Step S406), the gesture determination processor 45 determines that no determination gesture is made (Step S404) and returns to the gesture determination procedure illustrated in FIG. 7.

Referring back to FIG. 7, the gesture determination processor 45 determines the result of the determination operation determination process illustrated in FIG. 10 (Step S106).

If no determination gesture is made (No at Step S106), the gesture determination processor 45 temporarily stores the spatial coordinates R (Rx,Ry,Rz) acquired at Step S102 in the storage unit 46 as the spatial coordinates R' (Rx', Ry', Rz') and performs the determination operation threshold update process (FIG. 8) at Step S101 again.

If a determination gesture is made (Yes at Step S106), the processing circuit 23 transmits a determination operation command indicating that the determination gesture is made to the host device via the interface circuit 25 serving as a USB controller IC, for example.

Subsequently, the gesture determination processor 45 sets the determination operation standby determination threshold Rel_th. Specifically, the gesture determination processor 45 sets a value obtained by subtracting the offset value Cont_range from the third data Rz in the Z-direction of the spatial coordinates R (Rx,Ry,Rz) as the determination operation standby determination threshold Rel_th (Rel_th=Rz−Cont_range) (Step S108). Subsequently, the gesture determination processor 45 shifts to the release standby state and performs the determination operation standby determination threshold update process illustrated in FIG. 11 (Step S109 in FIG. 7).

In the release standby state after determining the determination operation, the gesture determination processor 45 determines whether the third data Rz in the Z-direction of the spatial coordinates R (Rx,Ry,Rz) is larger than a value obtained by adding the offset value Cont_range to the determination operation standby determination threshold Rel_th (Rz>Rel_th−Cont_range) (Step S501).

If the third data Rz is equal to or smaller than the value obtained by adding the offset value Cont_range to the determination operation standby determination threshold Rel_th (RzRel≥th−Cont_range) (No at Step S501), the gesture determination processor 45 returns to the gesture determination procedure illustrated in FIG. 7.

If the third data Rz is larger than the value obtained by adding the offset value Cont_range to the determination operation standby determination threshold Rel_th (Rz>Rel_th−Cont_range) (Yes at Step S501), the gesture determination processor 45 sets the determination operation standby determination threshold Rel_th to the value obtained by subtracting the offset value Cont_range from the third data Rz (Rel_th=Rz−Cont_range) (Step S502). Subsequently, the gesture determination processor 45 determines whether the determination operation standby determination threshold Rel_th is larger than a value obtained by subtracting the offset value Cont_range from the first determination operation determination threshold Sel_th1 (Rel_th>Sel_th1−Cont_range) (Step S503).

If the determination operation standby determination threshold Rel_th is equal to or smaller than the value obtained by subtracting the offset value Cont_range from the first determination operation determination threshold Sel_th1 (Rel_th≤Sel_th1-Cont_range) (No at Step S503), the gesture determination processor 45 temporarily stores the determination operation standby determination threshold Rel_th calculated at Step S502 in the storage unit 46 and returns to the gesture determination procedure illustrated in FIG. 7.

If the determination operation standby determination threshold Rel_th is larger than the value obtained by subtracting the offset value Cont_range from the first determination operation determination threshold Sel_th1 (Rel_th>Sel_th1−Cont_range) (Yes at Step S503), the gesture determination processor 45 temporarily stores the value obtained by subtracting the offset value Cont_range from the first determination operation determination threshold Sel_th1 in the storage unit 46 as the determination operation standby determination threshold Rel_th (Step S504) and returns to the gesture determination procedure illustrated in FIG. 7.

Referring back to FIG. 7, the gesture determination processor 45 performs the process of acquiring the spatial coordinates R (Rx,Ry,Rz) from the coordinate calculator 44 (Step S110) and determines whether the spatial coordinates R (Rx,Ry,Rz) can be acquired (Step S111). If the spatial coordinates R (Rx,Ry,Rz) fail to be acquired (No at Step S111), the gesture determination processor 45 temporarily stores the spatial coordinates R'(Rx',Ry',Rz') where the first data Rx'=0, the second data Ry'=0, and the third data Rz'=0 are satisfied in the storage unit 46 and performs the determination operation threshold update process (FIG. 8) at Step S101 again.

If the spatial coordinates R (Rx,Ry,Rz) are acquired (Yes at Step S111), the gesture determination processor 45 determines whether the acquired third data Rz is smaller than the determination operation standby determination threshold Rel_th (Rz<Rel_th) (Step S112). If the third data Rz is equal to or larger than the determination operation standby determination threshold Rel_th (Rz≥Rel_th) (No at Step S112), the gesture determination processor 45 performs the determination operation standby determination threshold update process (FIG. 11) at Step S109 again.

If the third data Rz is smaller than the determination operation standby determination threshold Rel_th (Rz<Rel_th) (Yes at Step S112), the gesture determination processor 45 sets the second determination operation determination threshold Sel_th2 to a value obtained by adding the offset value Cont_range to the third data Rz (Step S113). The gesture determination processor 45 temporarily stores the spatial coordinates R (Rx,Ry,Rz) acquired at Step S111 in the storage unit 46 as the spatial coordinates R' (Rx',Ry',Rz'). Subsequently, the gesture determination processor 45 shifts to the determination standby state for a determination gesture and performs the determination operation threshold update process (FIG. 8) at Step S101 again.

In the gesture determination procedure described above, a range Sel_th2 range of the second determination operation determination threshold Sel_th2 in the determination standby state for a determination gesture is a range of the second determination operation determination threshold minimum value Sel_th2_min to the first determination operation determination threshold Sel_th1 (Sel_th2_min≤Sel_th2≤Sel_th1) as illustrated in FIG. 12. If the movement speed of the object to be detected F (movement amount per unit time of the spatial coordinates R (Rx,Ry,Rz)) is equal to or smaller than a predetermined value (Yes at Step S405 in the determination operation determination process illustrated in FIG. 10), or if the negative movement speed of the object to be detected F in the Dz direction (movement amount per unit time in the minus direction of the third data Rz in the Z-direction of the spatial coordinates R (Rx,Ry,Rz)) is equal to or larger than a predetermined value in the range Sel_th2 range of the second determination operation determination threshold Sel_th2 (Yes at Step S406 in the determination operation determination process illustrated in FIG. 10), the gesture determination processor 45 determines that a determination gesture is made.

In the release standby state after determining the determination operation, if the third data Rz in the Z-direction of the spatial coordinates R (Rx,Ry,Rz) is larger than the value obtained by adding the offset value Cont_range to the determination operation standby determination threshold Rel_th (Yes at Step S501 in the determination operation standby determination threshold update process illustrated in FIG. 11), the value obtained by subtracting the offset value Cont_range from the third data Rz is set as the determination operation standby determination threshold Rel_th (Rel_th=Rz−Cont_range) (Step S502 in the determination operation standby determination threshold update process illustrated in FIG. 11).

In the release standby state after determining the determination operation, if the third data Rz in the Z-direction of the spatial coordinates R (Rx,Ry,Rz) is equal to or smaller than the first determination operation determination threshold Sel_th1 (Yes at Step S503 in the determination operation standby determination threshold update process illustrated in FIG. 11), the value obtained by subtracting the offset value Cont_range from the first determination operation determination threshold Sel_th1 is set as the determination operation standby determination threshold Rel_th (Rel_th=Sel_th1−Cont_range) (Step S504 in the determination operation standby determination threshold update process illustrated in FIG. 11).

Therefore, a range Rel_th range of the determination operation standby determination threshold Rel_th is, as illustrated in FIG. 12, a range of the value obtained by subtracting the offset value Cont_range from the second determination operation determination threshold minimum value Sel_th2_min to the value obtained by subtracting the offset value Cont_range from the first determination operation determination threshold Sel_th1 (Sel_th2_min−Cont_range≤Rel_th≤Sel_th1−Cont_range).

The following describes a specific example of operation in the gesture determination procedure described above in greater detail with reference to FIG. 13. FIG. 13 is a timing chart of a specific example of operation in the gesture determination procedure illustrated in FIG. 7.

In the example illustrated in FIG. 13, the spatial coordinates R (Rx,Ry,Rz) can be acquired at time t0 (Yes at Step S103). At time t1, the third data Rz in the Z-direction of the spatial coordinates R (Rx,Ry,Rz) falls below the second determination operation determination threshold minimum value Sel_th2_min. At time t2, the movement amount per unit time of the spatial coordinates R (Rx,Ry,Rz) is equal to or smaller than the predetermined value (Yes at Step S405 in the determination operation determination process illustrated in FIG. 10), and it is determined that a determination gesture is made (Step S402). At this time, the determination operation standby determination threshold Rel_th is set to the value obtained by subtracting the offset value Cont_range from the third data Rz (Rel_th=Rz−Cont_range) (Step S108), and the gesture determination processor 45 shifts to the release standby state.

In the subsequent period until time t3, the third data Rz in the Z-direction of the spatial coordinates R (Rx,Ry,Rz) is equal to or smaller than the value obtained by adding the offset value Cont_range to the determination operation standby determination threshold Rel_th (No at Step S501 in the determination operation standby determination threshold update process illustrated in FIG. 11). Therefore, the determination operation standby determination threshold Rel_th is not updated. If the third data Rz falls below the value obtained by adding the offset value Cont_range to the determination operation standby determination threshold Rel_th at time t3 (Yes at Step S501), the value obtained by subtracting the offset value Cont_range from the third data Rz is set as the determination operation standby determination threshold Rel_th (Rel_th=Rz−Cont_range) in the period until time t4 (Step S502).

In the subsequent period until time t5, the third data Rz in the Z-direction of the spatial coordinates R (Rx,Ry,Rz) is equal to or smaller than the value obtained by adding the offset value Cont_range to the determination operation standby determination threshold Rel_th (No at Step S501). Therefore, the determination operation standby determination threshold Rel_th is not updated. If the third data Rz falls below the determination operation standby determination threshold Rel_th at time t5 (Yes at Step S112), the gesture determination processor 45 shifts to the determination standby state for a determination gesture. The value obtained by adding the offset value Cont_range to the third data Rz is set as the second determination operation determination threshold Sel_th2 (Sel_th2=Rz−Cont_range) (Step S113), and the gesture determination processor 45 shifts to the determination standby state.

If the third data Rz' of the spatial coordinates R' (Rx',Ry', Rz') temporarily stored at Step S103 falls below the value obtained by subtracting the offset value Cont_range from the second determination operation determination threshold Sel_th2 at time t6 (Rz'<Sel_th2−Cont_range, Yes at Step S201 in the determination operation threshold update process illustrated in FIG. 8), the value obtained by adding the offset value Cont_range to the third data Rz' (Sel_th2=Rz'+Cont_range, Step S202) falls below the second determination operation determination threshold minimum value Sel_th2_min in the subsequent period until time t7 (Sel_th2<Sel_th2_min, Yes at Step S203). The second determination operation determination threshold Sel_th2 is set to the second determination operation determination threshold minimum value Sel_th2_min (Step S204). In the subsequent period until time t9, the third data Rz' temporarily stored at Step S103 is equal to or larger than the value obtained by subtracting the offset value Cont_range from the second determination operation determination threshold Sel_th2 (Rz'Sel_th2−Cont_range, No at Step S201). Therefore, the second determination operation determination threshold Sel_th2 is not updated and remains the second determination operation determination threshold minimum value Sel_th2_min.

At time t8, the third data Rz in the Z-direction of the spatial coordinates R (Rx,Ry,Rz) falls below the second determination operation determination threshold minimum value Sel_th2_min. In the subsequent period until time t9, if the movement amount per unit time of the spatial coordinates R (Rx,Ry,Rz) is larger than the predetermined value (No at Step S405 in the determination operation determination process illustrated in FIG. 10), and if the movement amount per unit time in the minus direction of the third data Rz in the Z-direction of the spatial coordinates R (Rx,Ry,Rz) remains smaller than the predetermined value (No at Step S406), and the third data Rz falls below the first determination operation determination threshold Sel_th1 at time t9 (Yes at Step S401), it is determined that a determination gesture is made (Step S402). At this time, the determination operation standby determination threshold Rel_th is set to the value obtained by subtracting the offset value Cont_range from the third data Rz (Rel_th=Rz−Cont_range) (Step S108), and the gesture determination processor 45 shifts to the release standby state.

In the subsequent period until time t12, the third data Rz' temporarily stored at Step S103 is equal to or larger than the value obtained by subtracting the offset value Cont_range from the second determination operation determination threshold Sel_th2 (Rz'≥Sel_th2−Cont_range, No at Step S201). Therefore, the determination operation standby determination threshold Rel_th is not updated. In other words, during the period from time t9 when the third data Rz falls below the first determination operation determination threshold Sel_th1 to time t12, if the third data Rz exceeds the first determination operation determination threshold Sel_th1 at time t10, the gesture determination processor 45 does not shift to the determination standby state for a determination gesture; and if the third data Rz falls below the first determination operation determination threshold Sel_th1 at subsequent time t11, it is not determined that a determination gesture is made.

If the third data Rz in the Z-direction of the spatial coordinates R (Rx,Ry,Rz) falls below the determination operation standby determination threshold Rel_th at subsequent time t12 (Yes at Step S113), the gesture determination processor 45 shifts to the determination standby state for a determination gesture. The value obtained by adding the offset value Cont_range to the third data Rz is set as the second determination operation determination threshold Sel_th2 (Sel_th2=Rz−Cont_range) (Step S113), and the gesture determination processor 45 shifts to the determination standby state.

As described above, in the gesture determination procedure according to the embodiment, it is determined that a determination gesture is made when the third data Rz in the Z-direction of the spatial coordinates R (Rx,Ry,Rz) indicating the position of the object to be detected F in the space on the detection region AA is equal to or larger than the first determination operation determination threshold Sel_th1.

If the third data Rz in the Z-direction of the spatial coordinates R (Rx,Ry,Rz) is equal to or larger than the second determination operation determination threshold minimum value Sel_th2_min and smaller than the first determination operation determination threshold Sel_th1, and if the movement amount ΔRxy per unit time in the XY-plane of the spatial coordinates R (Rx,Ry,Rz) in the space in the detection region AA is equal to or smaller than the movement amount threshold ΔRxy_th (ΔRxy≤ΔRxy_th), and the movement amount ΔRz in the Z-direction is equal to or smaller than the first movement amount threshold ΔRz_th1 (|ΔRz|≤ΔRz_th1), it is determined that a determination gesture is made.

If the third data Rz in the Z-direction of the spatial coordinates R (Rx,Ry,Rz) is equal to or larger than the second determination operation determination threshold minimum value Sel_th2_min and smaller than the first determination operation determination threshold Sel_th1, and if the movement amount ΔRz per unit time in the Z-direction is a negative value (ΔRz<0), and the magnitude |ΔRz| of the movement amount per unit time in the Z-direction is equal to or larger than the second movement amount threshold ΔRz_th2 (|ΔRz|≥ΔRz_th2), it is determined that a determination gesture is made.

In other words, the detecting device 1 according to the embodiment detects that a determination gesture is made when the distance D in the Dz direction (third direction) between the detection surface S of the sensor unit 10 and the object to be detected F is equal to or smaller than the first distance D1th corresponding to the first determination operation determination threshold Sel_th1.

The detecting device 1 according to the embodiment also detects that a determination gesture is made when the distance D in the Dz direction (third direction) between the detection surface S of the sensor unit 10 and the object to be detected F is equal to or smaller than the second distance D2th corresponding to the second determination operation determination threshold Sel_th2 and larger than the first distance D1th, and when the movement speed of the object to be detected F in the space on the detection region AA (corresponding to the movement amount ΔRxy per unit time in the XY-plane of the spatial coordinates R (Rx,Ry,Rz) and the movement amount ΔRz per unit time in the Z-direction) is equal to or smaller than the predetermined value (corresponding to the movement amount threshold ΔRxy_th in the XY-plane of the spatial coordinates R (Rx,Ry,Rz) and the first movement amount threshold ΔRz_th1 in the Z-direction).

The detecting device 1 according to the embodiment also detects that a determination gesture is made when the distance D in the Dz direction (third direction) between the detection surface S of the sensor unit 10 and the object to be detected F is equal to or smaller than the second distance D2th and larger than the first distance D1th, and when the speed at which the object to be detected F moves away from the detection surface S of the sensor unit 10 in the Dz direction (third direction) (corresponding to the magnitude |ΔRz| of the negative movement amount ΔRz per unit time in the Z-direction of the spatial coordinates R (Rx,Ry,Rz)) is equal to or larger than the predetermined value (corresponding to the second movement amount threshold ΔRz_th2 in the Z-direction of the spatial coordinates R (Rx,Ry,Rz)).

With this configuration, the detecting device 1 can expand the range of the determination operation while limiting the movement speed of the object to be detected F and improve the accuracy of detecting the determination gesture.

While an exemplary embodiment according to the present disclosure has been described, the embodiment is not intended to limit the present disclosure. The contents disclosed in the embodiment are given by way of example only, and various modifications may be made without departing from the spirit of the present disclosure. Appropriate modifications made without departing from the spirit of the present disclosure naturally fall within the technical scope of the present disclosure.

What is claimed is:

1. A detecting device comprising:
   a sensor unit having a detection region in which a plurality of electrodes are arrayed; and
   a detector configured to detect a gesture corresponding to movement of an object to be detected in a space on the detection region based on a detected value of each of the electrodes, wherein
   the detector detects that a predetermined determination gesture is made when a distance between the sensor unit and the object to be detected is equal to or smaller than a first distance,
   the detector detects that the determination gesture is made when the distance between the sensor unit and the object to be detected is equal to or smaller than a second distance larger than the first distance and is larger than the first distance and when a movement speed of the object to be detected in the space on the detection region is equal to or smaller than a predetermined value,
   the detector comprises:
   a coordinate calculator configured to calculate a spatial coordinate of the object to be detected in the space on the detection region based on the detected value of each of the electrodes; and
   a gesture determination processor configured to determine whether the determination gesture is made based on the spatial coordinate,
   the coordinate calculator calculates:
   first data indicating coordinate data in an X-direction;
   second data indicating coordinate data in a Y-direction orthogonal to the X-direction; and
   third data indicating coordinate data in a Z-direction orthogonal to the XY-plane,
   the third data is larger as the distance between the sensor unit and the object to be detected is smaller,
   the gesture determination processor determines that the determination gesture is made when the third data is equal to or larger than a first determination operation determination threshold corresponding to the first distance, and
   the gesture determination processor determines that the determination gesture is made when the third data is smaller than the first determination operation determination threshold and equal to or larger than a second determination operation determination threshold corresponding to the second distance, and when a movement amount per unit time in the XY-plane is equal to or smaller than a movement amount threshold and when a magnitude of a movement amount per unit time in the Z-direction is equal to or smaller than a first movement amount threshold.

2. The detecting device according to claim 1, wherein the detector detects that the determination gesture is made when the distance between the sensor unit and the object to be detected is equal to or smaller than the second distance and larger than the first distance and when a speed at which the object to be detected moves away from the sensor unit is equal to or larger than a predetermined value.

3. The detecting device according to claim 1, wherein the gesture determination processor shifts to a determination standby state for the determination gesture when the third data is smaller than a value obtained by subtracting a predetermined offset value from the first determination operation determination threshold after it is determined that the determination gesture is made when the third data is equal to or smaller than the first determination operation determination threshold.

4. The detecting device according to claim 3, wherein the gesture determination processor shifts to the determination standby state when the third data is smaller than a value obtained by subtracting the offset value from a value at which the third data is maximum in a range smaller than the first determination operation determination threshold after it is determined that the determination gesture is made when the third data is equal to or smaller than the second determination operation determination threshold.

5. The detecting device according to claim 4, wherein the gesture determination processor sets a value obtained by adding the offset value to the third data as the second determination operation determination threshold after shifting to the determination standby state.

6. The detecting device according to claim 5, wherein
   the second determination operation determination threshold is limited to a second determination operation determination threshold minimum value smaller than the first determination operation determination threshold, and
   the gesture determination processor limits the second determination operation determination threshold to the second determination operation determination threshold minimum value when the third data is smaller than a value obtained by subtracting the offset value from the second determination operation determination threshold and when the value obtained by adding the offset value to the third data is smaller than the second determination operation determination threshold minimum value after shifting to the determination standby state.

7. The detecting device according to claim 1, wherein
   the gesture determination processor determines that the determination gesture is made when the third data is smaller than the first determination operation determination threshold and equal to or larger than the second determination operation determination threshold, and when the movement amount per unit time in the Z-direction is a negative value and when the magnitude of the movement amount per unit time in the Z-direction is equal to or larger than the second movement amount threshold.

8. The detecting device according to claim 3, wherein
   the gesture determination processor determines that the determination gesture is made when the third data is smaller than the first determination operation determination threshold and equal to or larger than the second determination operation determination threshold, and when the movement amount per unit time in the Z-direction is a negative value and when the magnitude of the movement amount per unit time in the Z-direction is equal to or larger than the second movement amount threshold.

9. The detecting device according to claim 4, wherein
the gesture determination processor determines that the determination gesture is made when the third data is smaller than the first determination operation determination threshold and equal to or larger than the second determination operation determination threshold, and when the movement amount per unit time in the Z-direction is a negative value and when the magnitude of the movement amount per unit time in the Z-direction is equal to or larger than the second movement amount threshold.

10. The detecting device according to claim 5, wherein
the gesture determination processor determines that the determination gesture is made when the third data is smaller than the first determination operation determination threshold and equal to or larger than the second determination operation determination threshold, and when the movement amount per unit time in the Z-direction is a negative value and when the magnitude of the movement amount per unit time in the Z-direction is equal to or larger than the second movement amount threshold.

11. The detecting device according to claim 6, wherein
the gesture determination processor determines that the determination gesture is made when the third data is smaller than the first determination operation determination threshold and equal to or larger than the second determination operation determination threshold, and when the movement amount per unit time in the Z-direction is a negative value and when the magnitude of the movement amount per unit time in the Z-direction is equal to or larger than the second movement amount threshold.

* * * * *